June 13, 1950      H. L. BURKHARDT      2,511,694
SPEED INDICATOR

Filed Sept. 18, 1947      2 Sheets-Sheet 1

*INVENTOR.*
Harry L. Burkhardt
BY
Andrew K. Foulds
his ATTORNEY

June 13, 1950     H. L. BURKHARDT     2,511,694
SPEED INDICATOR
Filed Sept. 18, 1947     2 Sheets-Sheet 2
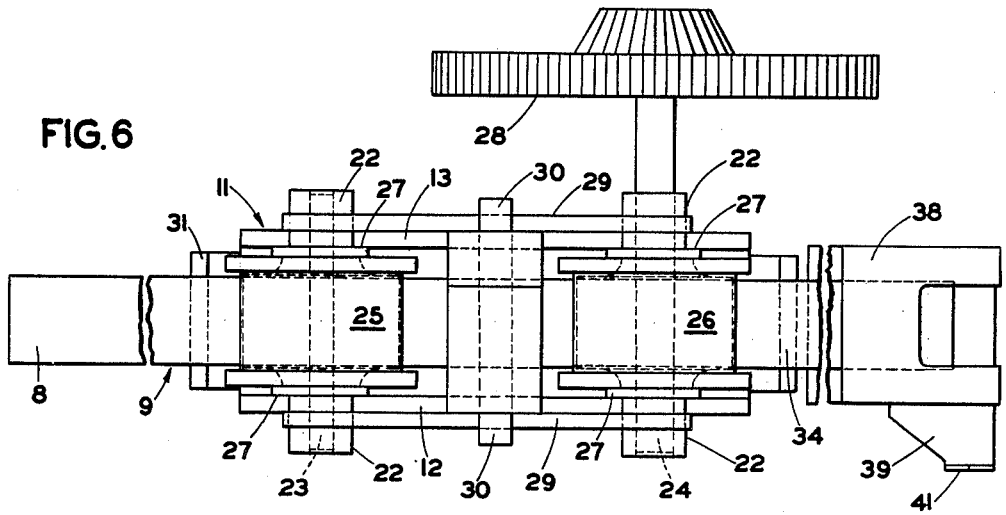
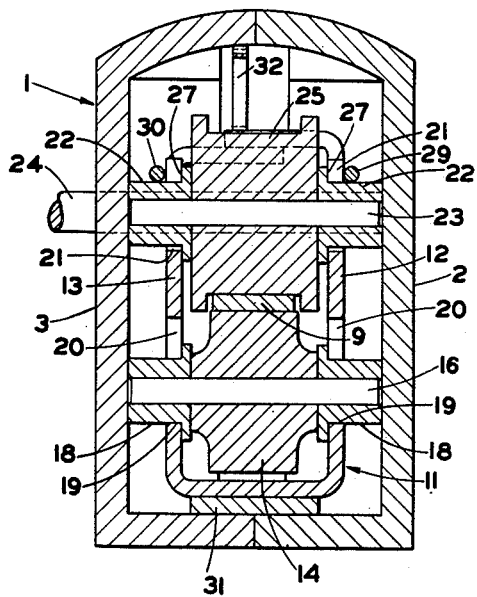
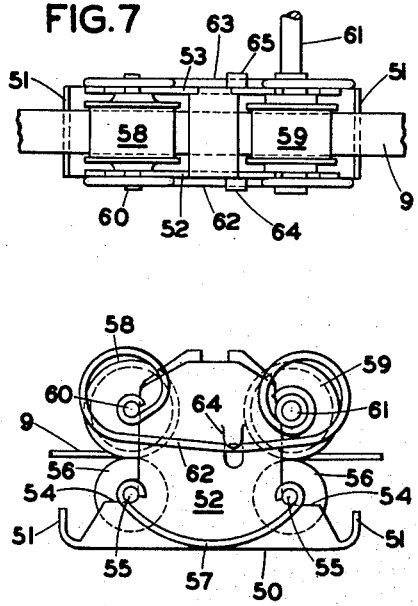
INVENTOR.
Harry L. Burkhardt
BY
Andrew K. Foulds
his ATTORNEY Patented June 13, 1950

2,511,694

UNITED STATES PATENT OFFICE 2,511,694

SPEED INDICATOR

Harry L. Burkhardt, Elmira, N. Y.; Helen J. Burkhardt executrix of said Harry L. Burkhardt, deceased Application September 18, 1947, Serial No. 774,841

12 Claims. (Cl. 264—1)

1

This invention relates to new and useful improvements in vibration responsive devices and more particularly to such a device which is especially adapted for indicating the rate of rotation of revolving shafts or other rotating parts.

An object of the invention is to provide an indicating device of simple and readily assembled construction.

Another object is to provide a rugged but accurate instrument which will not easily get out of order.

Another object is to provide a novel supporting structure for a vibration responsive reed.

The invention consists in the improved construction and cooperative relation of parts to be more fully described hereinafter and the novelty of which will be particularly pointed out and distinctly claimed.

Figure 1:
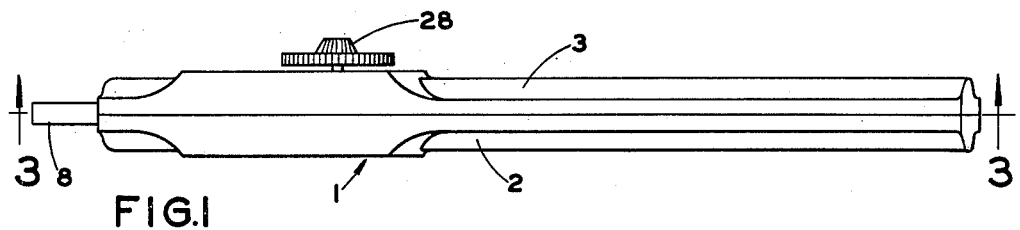
Figure 2:
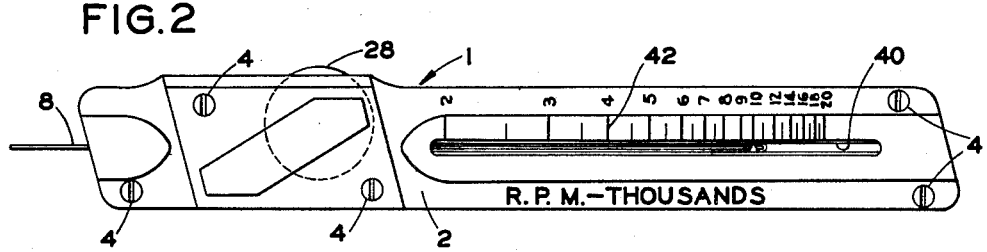
Figure 3:
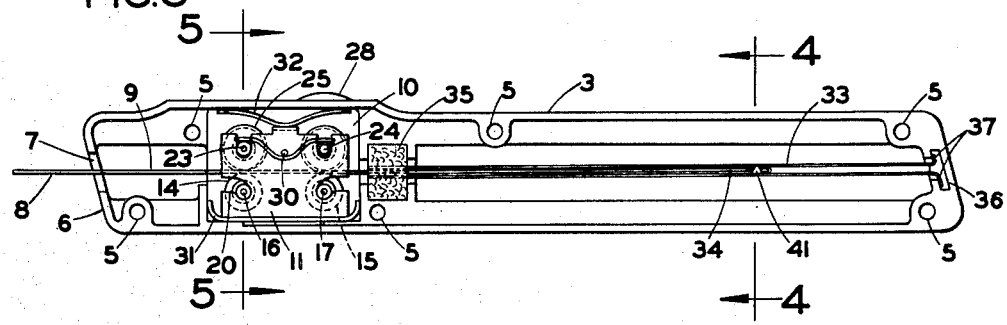
Figure 4:
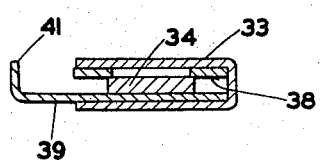

In the accompanying drawings to be taken as a part of this specification, there are fully and clearly illustrated several preferred embodiments of the invention, in which drawings, Figure 1 is a top plan view of the speed indicating device, Fig. 2 is a front view in elevation, Fig. 3 is a view in central section on the line 3—3 of Fig. 1, but showing the internal mechanism in elevation in one of halves of the casing, Fig. 4 is an enlarged detail view in section on the line 4—4 of Fig. 3, Fig. 5 is an enlarged view in section on the line 5—5 of Fig. 3, Fig. 6 is an enlarged plan view of part of the reed supporting mechanism removed from the casing, Fig. 7 is a plan view of another form of reed supporting mechanism, and Fig. 8 is a view in side elevation of the mechanism of Fig. 7.

Referring to the drawings by characters of reference, the numeral 1 designates the rigid elongated metal casing, preferably die-cast, which forms the supporting structure of the indicating device. The casing 1 comprises two mating parts, a front section 2 and a rear section 3 which are of generally similar hollow or of shell-like construction so that the internal formation of the rear section 3 alone is shown. The sections 2, 3 are joined and clamped together by screws 4 which pass through apertures in the front section 2 and are screw-threaded into holes 5 in the rear section 3. Through the end wall 6, there is an opening 7 through which the free end 8 of the vibratory tuning reed 9 which is of tempered spring steel, freely projects. Adjacent the end

2 wall 6, the casing 1 has a chamber 10 formed by registering recesses in the sections 2, 3.

Positioned within the chamber 10 there is a housing 11 of sheet metal bent into a flat open-ended tube having front and rear side walls 12, 13 respectively. The reed 9 passes freely through the housing 11 and rests upon longitudinally spaced rollers 14, 15 positioned within the housing. Shafts 16, 17 respectively support the rollers 14, 15. Each shaft end is provided with a bearing bushing 18, each of which seats on an upward facing shoulder 19 formed by a semicircular recess at the inner end of housing end wall slots 20. In the upper edges of the front and rear housing walls 12, 13, there are spaced bearing slots or recesses 21 which receive shaft end bearings or bushings 22 for roller supporting shafts 23, 24. Within the housing 11 and mounted on the shafts 23, 24 there are flanged rollers 25, 26 respectively. The bushings 18, 22 preferably fit in the slots or recesses and are provided with inner end flanges 27 which bear against the inside faces of the housing walls to hold the rollers against endwise play. The roller 26 is fixed to the shaft 24 which projects through an opening in the rear casing section 3 and has fixed on its externally projecting end portion a finger grip knob 28. The side or end flanges on the rollers 25, 26 laterally confine the reed 9 against displacement from its supporting rollers 14, 15. The rollers 25, 26 are resiliently urged against the reed 9 by springs 29 of stiff wire which bear at their ends on the bushings 22. The spring wires 29 are looped at their mid-portions under the projecting ends of a rod or pin 30 which extends through the side walls 12, 13. The springs 29 thus serve to clamp the reed 9 between the opposed pairs 14, 25 and 15, 26 of the rollers. The housing bottom wall has a locating strip or member 31 secured thereto as by brazing for example. The strip 31 has up-turned end portions which fit against the opposite end walls of the chamber 10 to hold the housing 11 against end-wise or longitudinal movement in the casing 1. A bowed leaf spring 32 is compressed between the top walls of the chamber 10 and housing 11 and serves to hold the housing 11 tightly against the chamber bottom wall.

Extending in tangential relation to the clamping rollers, there is a rigid channel supporting member 33 which slidably receives the inner end portion 34 of the reed 9. The end of the member 33 adjacent the housing 11 is adjustably held in proper tangential alinement and against vibration by a block 35 of compressible damping material, such as felt. The other end portion of the channel member extends into a T-shaped slot in the casing end wall 36 and terminates in out-turned flanges 37 so that the channel member is locked in position between the sections 2 and 3. Folded over the reed end portion 34 there is a sheet metal guide member 38 which slidably fits between the channel member walls so as to hold the end portion 34 against vibration in casing 1. The guide member 38 has a flange or extension 39 which projects from the open side of the channel member and into a longitudinal slot 40 in the front section 2. The extension 39 terminates in a pointer 41 which travels in the slot 40 which registers or is alined with the open side of the channel member. The casing section 2 is provided with indicia 42 along the side edge of the slot 40, designating revolutions per minute and with which the pointer 41 cooperates. The location of the indicia lines may be determined by calibrating the instrument or device with shafts of known speed. The ordinary calibration or scale marking would be for an indicator to be used with a single cylinder, two cycle engine, as such a scale marking would be equally applicable for direct reading of any belt driven or electric motor driven shaft. In order to overcome further undesirable vibration of the reed 9 between the housing 11 and the end portion 34, the reed is warped or bent so that it resiliently engages a wall of the channel member 33.

The operation of the device to determine the speed of a rotating shaft, which may for example be an electric motor driven shaft, or a belt-turned shaft, or the crank shaft of the common and usual single cylinder, two cycle model aircraft engine, is as follows: The side of the casing 1 adjacent the chamber 10 is held tightly against the engine mounting or crank casing or against a shaft bearing or other machine part. The wheel or knob 28 is then rotated slowly to extend or retract the reed 9 until the tip of the end portion 8 attains its maximum amplitude of vibration. The pointer 41 moves with the reed so that the revolutions per minute which correspond to the maximum vibration may be read directly from the casing indicia 42. It will be obvious to anyone skilled in the art of engines that if the engine was one of two cylinders, two cycle, the scale reading, if calibrated as above, would show twice the actual speed. Obviously, the device can be calibrated for direct reading for this or other special uses.

In Figs. 7 and 8, there is shown another form of flat tubular housing structure with open ends and operable to support the reed 9 and to be held in the chamber 10 by the spring 32. This housing 50 has up-turned base end portions 51 to fit against the end walls of the chamber 10 similarly to the member 31. The front and rear housing walls 52, 53 respectively have upward facing shoulders 54 at the housing ends. Shafts 55 rest upon the shoulders 54 and extend across the housing to support rollers 56 on which the reed 9 rests. The rollers 56 are held in position by front and rear springs 57, of which the front spring only is shown, and which have their ends looped about the ends of the shafts 55. The springs 57 urge the rollers 56 toward each other and thereby retain the shafts 55 on their respective shoulders 54. Cooperable with the reed 9 and the rollers 56 are upper flanged rollers 58, 59 which seat on top of the reed 9 and press it firmly against the lower rollers 56. The side flanges on the upper rollers 58, 59 serve to laterally confine the reed 9 and hold it against lateral displacement. The rollers 58, 59 have supporting shafts 60, 61 respectively which are held against the housing end edges by front and rear springs 62, 63 looped at their ends about the shaft ends. The rollers 58, 59 are tensioned downward against the reed 9 by the springs 62, 63 which are passed intermediate their ends beneath lugs or ears 64, 65 bent out of the front and rear walls 52, 53 respectively. The shaft 61 is fixed to its roller 59 so that the reed 9 will be shifted longitudinally by rotation of the shaft 61. The operation of the speed indicating device when equipped with the reed supporting structure of Figs. 7 and 8 will be apparent from the foregoing description.

Having thus described the invention, what is claimed and desired to be secured by Letters Patent of the United States is:

1. A vibration indicator comprising a supporting structure, two rollers journaled in said structure, a substantially straight and longitudinally movable tuning reed having a free vibratory end portion and extending between and engaging said rollers, said reed having two end portions which are spaced from each other by the roller-engaged portion and of which one of said end portions comprises said free end portion, means cooperable with the reed side edges to laterally confine said reed, spring means tensioned against said structure and urging one of said rollers against said reed to hold said reed tightly between said rollers, means spaced lengthwise of said reed from said rollers and rigidly supporting the other one of said two end portions of said reed, and means carried by said structure and cooperable with said reed to move said reed longitudinally to adjust the length of the free end portion of the reed extending beyond said rollers and opposite said other end portion.

2. A vibration indicator comprising a supporting structure, two rollers journaled in said structure, a substantially straight and longitudinally movable tuning reed having a free vibratory end portion and extending between and engaging said rollers, said reed having two end portions which are spaced from each other by the roller-engaged portion and of which one of said end portions comprises said free end portion, one of said rollers having side flanges laterally confining said reed, spring means tensioned against said structure and urging one of said rollers against said reed to hold said reed tightly between said rollers, means spaced from said rollers and rigidly supporting the other one of said two end portions of said reed, a pointer carried by said other reed end portion, said structure having indicia cooperable with said pointer, and means carried by said structure and cooperable with said reed to move said reed longitudinally to adjust the length of the free end portion of the reed extending beyond said rollers and opposite said other end portion.

3. A vibration indicator comprising a supporting structure, two rollers journaled in said structure, a substantially straight and longitudinally movable tuning reed having two ends and extending between and engaging said rollers, one of said rollers having side flanges laterally confining said reed, spring means tensioned against said structure and urging one of said rollers against said reed to hold said reed tightly between said rollers, means spaced from said rollers and rigidly supporting one of said two ends of said reed, the other of said two reed ends comprising a free end portion, dampening means surrounding said reed between said rollers and said one end, and means carried by said structure and cooperable with said reed to move said reed longitudinally between said rollers thereby to adjust the length of the free end portion of the reed extending beyond said rollers and opposite said one end.

4. A vibration indicator comprising a supporting structure, two rollers journaled in said structure, a substantially straight and longitudinally movable tuning reed extending between and engaging said rollers, said reed having end portions extending oppositely from said rollers, means cooperable with the reed side edges to laterally confine said reed, spring means tensioned against said structure and urging one of said rollers against said reed to hold said reed tightly between said rollers, a rigid sheath carried by said structure and slidably receiving one end portion of said reed, means on the end of said reed end portion which extends into said sheath and cooperable with said sheath to hold said sheathed end portion against vibration, and means to move said reed longitudinally between said rollers thereby to adjust the length of the said reed end portion which extends beyond said rollers and is opposite said sheathed end.

5. A vibration indicator comprising a supporting structure, two rollers journaled in said structure, a tuning reed extending between and engaging said rollers, means resiliently urging one of said rollers against said reed to hold said reed tightly between said rollers, a rigid channel member secured at its opposite ends to said structure and slidably receiving one end portion of said reed, a pointer carried by said reed end portion and projecting from the open side of said channel member, said structure having indicia cooperable with said pointer, and means to move said reed longitudinally to adjust the length of the other end portion of said reed projecting beyond said rollers.

6. A vibration indicator comprising a supporting structure, two rollers journaled in said structure, a tuning reed extending between and engaging said rollers, means resiliently urging one of said rollers against said reed to hold said reed tightly between said rollers, a rigid channel member secured at its opposite ends to said structure and slidably receiving one end portion of said reed, said reed being bowed for lateral engagement with a wall of said channel member to dampen vibration of said reed end portion, a pointer carried by said reed end portion and projecting from the open side of said channel member, said structure having indicia cooperable with said pointer, and means to move said reed longitudinally to adjust the length of the other end portion of said reed projecting beyond said rollers.

7. A vibration indicator comprising a casing, a housing supported in said casing, two pairs of rollers journaled in said housing, a metal tuning reed extending between and engaging each of said rollers and extending at its opposite ends from said housing, means resiliently urging one of each of said pairs of rollers against said reed to hold said reed tightly against the others of said rollers, a rigid channel member spaced from said housing and carried by said casing and extending substantially tangent to said rollers and receiving one end of said reed, means holding said one reed end against vibration in said channel member, and means to adjust the length of the other end portion of said reed extending beyond said rollers.

8. A vibration indicator comprising a casing, a housing supported in said casing, two pairs of rollers journaled in said housing, a metal tuning reed extending between and engaging each of said rollers and extending at its opposite ends from said housing, means resiliently urging one of each of said pairs of rollers against said reed to hold said reed tightly against the others of said rollers, a rigid channel member spaced from said housing and carried by said casing and extending substantially tangent to said rollers and receiving one end of said reed, means holding said one reed end against vibration in said channel member, and means to adjust the length of the other end portion of said reed extending beyond said rollers, said casing having a slot alined with the open side of said channel member, said holding means having an indicator pointer projecting through said slot, and indicia on said casing cooperable with said pointer.

9. A vibration indicator comprising an elongated casing having end walls and being divided longitudinally into mating halves, said casing having an opening through one end wall and having a chamber adjacent said one wall, the other end wall having a socket, a channel member having one end secured in said socket and having its other end alined with said opening, means in said casing supporting said other channel member end, a housing mounted within said chamber, two longitudinally spaced pairs of rollers in said housing, an elongated metal tuning reed reciprocal in said channel member and projecting through said end wall opening, said reed resting upon one of each of said pairs of rollers, spring means tensioned between said housing and the others of said pairs of rollers and urging said other rollers against said reed thereby to clamp said reed between each of said pairs of rollers, said casing having a slot registering with the open side of said channel member and having indicia adjacent said slot, a pointer on said reed and projecting through said slot for cooperation with said indicia, one of said rollers having a shaft extending out of said casing, and a knob on said shaft for manually rotating said one roller to adjust said reed.

10. In a vibrating reed type indicator, a flat tubular housing having open ends, the side walls of said housing having alined upward facing shoulders adjacent each end, shafts extending across said housing and seating on said shoulders, means holding said shafts on said shoulders, a pair of rollers, one on each of said shafts, a pair of rollers cooperable with said rollers, an elongated tuning reed supported on said first pair of rollers, a pair of springs, one on each side of said housing and having their ends acting on and urging said second-named pair of rollers against said reed, and means on said housing cooperable with the intermediate portion of each of said springs to hold said springs under tension.

11. A vibration indicator comprising an elongated tubular casing having a longitudinal side wall opening and having an internal chamber spaced longitudinally from said opening, a housing enclosed in said chamber, longitudinally spaced upper and lower cooperable rollers journaled in said housing, a vibratory reed extending between said upper and lower rollers and alined with said side wall opening, a channel member having an open side facing said wall opening, means fixing one end of said channel member to one end of said casing, means resiliently supporting the other end of said channel member in alignment with the plane of tangency between said rollers, said reed extending into said channel member and having a free vibratory end portion projecting from said casing, and means to rotate one of said rollers to extend said reed free end portion from and retract said free end portion toward the interior of said casing thereby to regulate the vibratory length of said reed.

12. A vibration indicator comprising a casing having hollow elongated mating sides with abutting flanges forming top and bottom walls, said sides having matching recesses forming a chamber adjacent one end of said casing, a housing supported in said chamber, cooperable upper and lower pairs of rollers journaled in said housing, said casing having an opening through said one end, a vibratory reed extensible through said end opening and extending between said rollers, spring means clamping said rollers against said reed, means to rotate one of said rollers to move said reed into and from said casing, a channel member in said casing and alined with the plane of tangency between said rollers, said reed extending into said channel member, means rigidly securing one end of said channel member to the end of said casing opposite said end opening, and a pad member supported in said casing and adjustably supporting the other end of said channel member, said pad member permitting said channel member to aline with said plane.

HARRY L. BURKHARDT.

REFERENCES CITED

The following references are of record in the file of this patent:

UNITED STATES PATENTS

| Number | Name | Date |
|---|---|---|
| 759,512 | Frahm | May 10, 1914 |
| 1,687,507 | Perkins | Oct. 16, 1928 |
| 2,428,671 | Kent | Oct. 7, 1947 |